J. N. MATLOCK.

GLOBE-VALVE.

No. 6,952. Reissued Feb. 29, 1876.

Witnesses,

Chas. H. Smith.

Harold Serrell

Inventor

John N. Matlock.

per Lemuel W. Serrell

Att'y.

N. PETERS, PHOTO-LITHOGRAPHER, WASHINGTON, D. C.

UNITED STATES PATENT OFFICE.

JOHN N. MATLOCK, OF BROOKLYN, N. Y., ASSIGNOR TO BAKER, SMITH & CO.

IMPROVEMENT IN GLOBE-VALVES.

Specification forming part of Letters Patent No. 158,296, dated December 29, 1874; reissue No. 6,952, dated February 29, 1876; application filed January 5, 1876.

*To all whom it may concern:*

Be it known that I, JOHN N. MATLOCK, of Brooklyn, in the county of Kings and State of New York, have invented an Improvement in Globe-Valves, of which the following is a specification:

Globe-valves are usually employed in connection with steam and hot-water apparatus, and under circumstances where rubber or other elastic packing is difficult of application, because it is more or less softened or injured by the heat; hence great difficulty arises in keeping the valve tight, and when the metallic surfaces are brought into contact it has heretofore been necessary to grind the valve to its seat.

My present invention is made for dispensing with elastic packing, and for avoiding the grinding of the valve to its seat. I make use of a valve with grooves in its face, and ribs between these grooves of a size adapted to be pressed upon the metallic seat, and to conform to the same by the pressure only, without grinding, and this is the result at any time, because the intervening ribs yield slightly to the pressure and accommodate any inequalities resulting from expansion of the metal under heat.

When a foreign substance intervenes between the valve and seat it will either be cut or pressed out of the way, or it may be received into the grooves.

Figure 1:
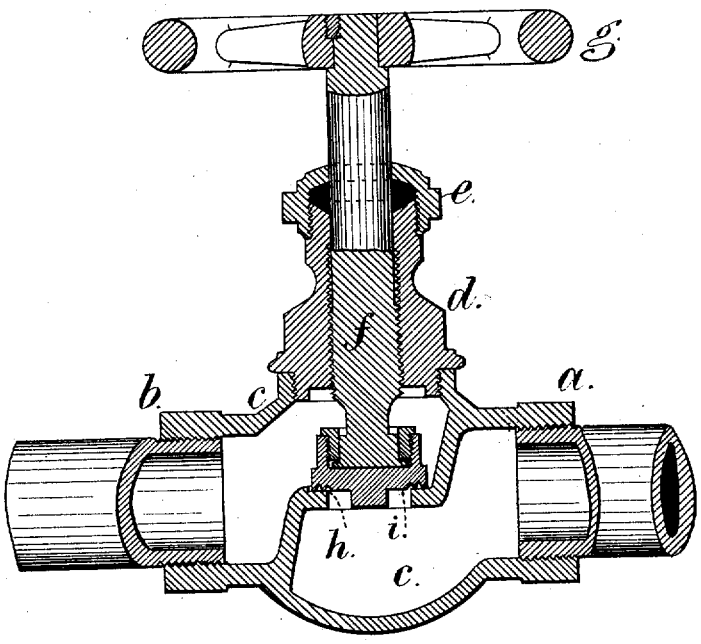
Figure 2:
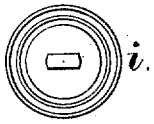

In the drawing, Figure 1 is a vertical section of the globe-valve, and Fig. 2 is an inverted plan of the valve.

The couplings *a b*, body *c*, cap *d*, packing-gland *e*, screw-stem *f*, and hand-wheel *g* are of usual construction. The valve-seat *h* is represented as flat, or nearly so, and the valve *i* should be loose at the end of the valve-stem, so that the stem can turn after the valve touches the seat. The surface of the valve is made with annular ribs and grooves, the ribs being sufficiently narrow to yield to any inequalities in the seat or surface of the rib. Thereby the valve and seat wear true, the one against the other, in consequence of the pressure, so that grinding is rendered unnecessary.

I am aware that a valve has been used with annular grooves in its face resting upon a seat of lead, leather, or other material that will assume a form to fit the corrugations of the valve.

In my valve the reverse is the case; the ribs between the grooves in the valve-face yield to the rigid seat by the pressure, thus dispensing with the lead, leather, or similar material.

I claim as my invention—

The valve *i*, containing annular ribs and grooves in the face thereof, in combination with the screw-stem *f*, rigid seat *h*, and body *c*, substantially as set forth.

Signed by me this 31st day of December, A. D. 1875.

JOHN N. MATLOCK.

Witnesses:
WM. H. POST,
L. W. HARVEY.